United States Patent Office 3,544,543
Patented Dec. 1, 1970

3,544,543
REACTION PRODUCT OF POLYMERCAPTANS AND EPISULFIDES
Carl C. Greco, Bronx, N.Y., and Stanley B. Mirviss, Stamford, Conn., assignors to Stauffer Chemical Company, New York, N.Y., a corporation of Delaware
No Drawing. Original application Nov. 7, 1966, Ser. No. 592,325, now Patent No. 3,453,126, dated July 1, 1969. Divided and this application May 31, 1968, Ser. No. 749,235
Int. Cl. C07g 17/00; C09d 1/00
U.S. Cl. 260—125
9 Claims

ABSTRACT OF THE DISCLOSURE

Plasticizers, useful in road marking compositons containing a major amount of elemental sulfur, are prepared by reacting a polymercaptan of the formula:

$$HS-R-(SH)_n$$

wherein R is a hydrocarbon containing up to and including 20 carbon atoms per molecule and $n$ is an integer of from 1 to 2 inclusive; with a compound containing an episulfide group.

---

This application is a division of U.S. Ser. No. 592,325, filed Nov. 7, 1966, now U.S. Pat. 3,453,126.

This invention relates to impact-resistant sulfur compositions suitable for marking roads which are prepared by reacting a plasticizer comprising the reaction product of an organic polymercaptan having up to 20 carbon atoms and an episulfide containing compound in a molar ratio of at least about 1:1, with elemental sulfur in a weight ratio of plasticizer to sulfur of from 1:99 to 1:4.

Considerable research has been conducted on the utilization of sulfur compositions because of the inherent properties which such compositions exhibit. They are generally inexpensive and resistant to attack by acids, penetration by tree roots, as well as resistant to the action of lubricating oils or gasoline. Accordingly, such compositions have been found useful for jointing brick, sewer pipe, segmental tile, and sewer brick. Sulfur compositions have also found use as road marking materials because of their inherent strength, flexibility and resiliency. Despite the considerable market potential for a successful plasticized road marking composition, suitable plasticizers have been mainly limited to the alkylene tetrasulfides, and specifically polyethylene tetrasulfide. One of the primary defects found with the polyalkylene tetrasulfides, and particularly polyethylene tetrasulfide, is the limited resistance to damage by impact which considerably limits their use for various applications.

It is the primary object of this invention to provide new compositions of matter.

It is a further object to provide sulfur compositions which are resistant to impact and which are suitable for marking roads, highways, and other paved surfaces.

Other objects will be apparent from the description which follows.

The compositions which we have discovered are unusually resistant to cracking by impact and, accordingly, are especially well suited for marking compositions and other applications where the utilization of sulfur compositions has not heretofore been feasible because of such deficiencies.

The novel plasticized compositions can be prepared by reacting elemental sulfur with a plasticizer reaction product of a polymercaptan and a compound containing an episulfide group in a plasticizer-sulfur weight ratio of from 1:99 to 1:1 and preferably from about 5:95 to 1:4.

The polymercaptans utilized in my invention can be represented by the following general formula:

$$HS-R-(SH)_n$$

wherein R is a hydrocarbon containing up to and including 20 carbon atoms per molecule and $n$ is an integer of from 1 to 2 inclusive. Illustrative of the hydrocarbon radicals as represented by R above are cyclic and acyclic aliphatic, aryl, and alkaryl. Representative examples of suitable polymercaptans that can be employed include cyclo-aliphatic compounds, such as dimercapto cyclohexane, dimercapto cyclopentane, dimercapto methyl cyclohexane, dimercapto ethylcyclohexane, dimercapto alphaterpinene, dipentene dimercaptan, dimercapto dicyclopentadiene, dimercapto di(methylcyclopentane), trimercapto cyclododecane, and dimercapto cyclooctane. Representative examples of suitable acyclic aliphatic polymercaptans include dimercapto ethane, dimercapto propane, dimercapto butane, dimercapto diethyl ether, dimercapto triethylene glycol, dimercapto hexane, dimercapto decane, ethylene glycol bis (thioglycolate), and ethylene glycol bis (mercapto propionate). Representative examples of suitable aryl polymercaptans include dimercapto benzene, dimercapto naphthalene and anthracene dimercaptan. Representative examples of suitable alkaryl polymercaptans include dimercapto methylbenzene, dimercapto ethylbenzene, dimercapto styrene, dimercapto isopropylbenzene, dimercapto xylene, dimercapto toluene and p-dimercapto diethylbenzene. Preferred polymercaptans are those having a mercapto ethyl or propyl substituent, such as dimercapto ethyl cyclohexane, dimercapto isopropyl cyclohexane, dipentene dimercaptan, dimercapto ethylbenzene, dimercapto isopropylbenzene, dimercapto ethyl toluene and the like.

Representative examples of suitable compounds containing an episulfide group include ethylene sulfide, propylene sulfide, 1-butene sulfide and cyclohexene sulfide.

If desired, a solvent can be employed. Suitable solvents include: the aliphatic alcohols such as ethanol, propanol and butanol; ethers such as dimethyl and diethyl ether; ketones such as acetone, diethyl ketone and methyl propyl ketone, and aromatic hydrocarbons such as benzene, xylene and toluene.

The polymercaptan is reacted with a compound containing an episulfide group in a molar ratio of at least about 1 mole of episulfide containing compound per mole of mercapto group in the polymercaptan in the presence of a catalyst according to the following reaction diagram wherein R is as previously defined and R' is a hydrogen or methyl group and $n$ is an integer of 1 to 2 inclusive:

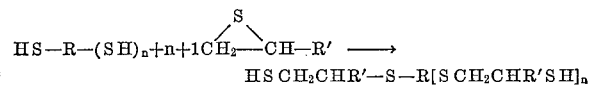

Although the above symmetrical product is believed to predominate, it is, of course, understood that the product constitutes a mixture of isomeric compounds to include unsymmetrical compounds such as are represented by the structural formula:

$$HSR(S)_n(CH_2CHR'SH)_{n+1}$$

wherein R, R' and $n$ are as previously defined.

Representative examples of catalysts include acidic catalysts such as boron trifluoride, aluminum chloride, stannic chloride and hydrogen fluoride; and basic catalysts, such as sodium hydroxide, calcium hydroxide, sodium ethoxide, triethyl amine, pyridine and piperdine.

The reaction is conducted for between about 10 and about 20 hours at a temperature between about 0° C. and 100° C. and preferably between about 40° C. and 65° C.

since higher temperatures increase the cost of processing and lower temperatures render the reaction impracticably slow. The reaction is spontaneously exothermic upon the addition of the catalyst but quickly subsides. The reaction mixture is then preferably maintained under reflux. The product can be recovered by removing the inert solvent if employed, such as by distillation and the product need not be further purified.

To prepare the plasticized compositions, the sulfur can be first melted and then such fillers, dyes and pigments as are desired can be added with the plasticizer. The order of addition is not critical, however, and the materials can be dry-mixed prior to heating. The preferred method of preparing the invention compositions is to heat the sulfur until in a molten state, i.e., from about 118° C. to about 250° C. and then react the molten sulfur with the plasticizer.

It is another embodiment of this invention to utilize a small amount of an alkaline material (hereinafter intended to include any substance whose aqueous solution is characterized by having a pH greater than 7) to aid in combining the reactants. While the addition of such alkaline material is not required, it is preferred. A variety of bases may be used as the alkaline material, such as are exemplified by tertiary amines to include trimethyl amine, triethyl amine, and pyridine; metal alkoxides, such as sodium methoxide and potassium tert-butoxide; and certain basic resins, such as anion-exchange resins. The preferred bases, however, are the alkali metal and alkaline earth metal bases, such as the carbonates, bicarbonates, the hydroxides and oxides. Examples of the preferred bases include sodium carbonate, sodium hydroxide, potassium hydroxide, lithium bicarbonate, sodium bicarbonate, rubidium bicarbonate, cesium carbonate, potassium carbonate, and ammonium carbonate. Only a small amount is used generally less than 1.5% by weight of the final composition.

A variety of fillers may be added to impart strength to the compositions to include the sulfates, such as barium sulfate and calcium sulfate; silicas as exemplified by calcium silicate, magnesium silicate and silica; flours such as soyabean, tobacco, walnut shell and wood flour, and various clays, such as kaolin, bentonite, ball and fire clay.

Various whiteners or pigments may be blended with the compositions when a light color is desired, and one particularly effective pigment is titanium dioxide. Two excellent yellow pigments are Hansa yellow (the coupling product between diazeotized p-nitroaniline and acetoacetanilide) and toluidine yellow (the coupling product between diazeotized m-nitro-p-toluidine and acetoacetanilide).

In order to protect against bacterial attack that might result in deterioration and loss of bond to the pavement, a minor amount of a bactericide, such as o-benzyl-p-chlorophenol-pentachlorophenol, or sodium pentachlorophenate may be added to the compositions.

The paved surface to which the sulfur composition is to be applied should be swept free of any dirt. The composition is then applied in the molten state by an applicator of the type used for applying paint which has been adapted to permit maintaining the temperature of the composition at about 140° C. A stripe may easily be laid in any desired thickness and will set to harden in a fraction of the time required for traffic paints.

The following examples will serve to illustrate the invention; all parts and percentages in said examples are on a weight basis.

EXAMPLE 1

To a 250 milliliter flask equipped with stirrer, condenser, thermometer, and dropping funnel, are added 50 grams (0.245 mole) of dipentene dimercaptan and 0.2 gram of sodium as catalyst dissolved in 150 milliliters of ethanol. To this mixture are then added 29.4 grams (0.49 mole) of ethylene sulfide dropwise by means of the dropping funnel. The reaction is exothermic and the temperature rises to 50° C. upon the addition. After the reaction subsides, the reaction mixture is heated to 60° C. and maintained at that temperature for 18 hours. A white semisolid precipitate formed, is filtered, dissolved in chloroform, and distilled under reduced pressure. 63 grams of a white solid material is recovered having a melting point of 55° C.

EXAMPLE 2

79 parts of elemental sulfur in the molten state at a temperature of 135° C. is poured into a 250 cc. stainless steel beaker contained in a heating mantel. To this beaker are then added 20 parts of the reaction product of Example 1, 1 part of calcium carbonate and the resultant melt is heated to 150° C. and maintained at this temperature for 30 minutes. The melt is poured into aluminum foil evaporating dishes, approximately 2" in diameter and ½" high, and allowed to cool to room temperature whereupon the compositions solidify. The solid compositions are then tested for impact strength.

To test for impact strength, two samples of the solid compositions are subjected to the Gardner lightduty impact tester. This test consists of dropping a 1-pound ball on the sample from progressively higher heights until a cracking is noted on the reverse side of the sample. The two plasticized compositions are found to have an impact resistance of 14 inch pounds. Two unplasticized sulfur compositions heated to 150° C. and maintained at that temperature for 30 minutes are also subjected to this test and found to have an impact resistance of less than 2 inch-pounds. A dipentene dimercaptan plasticized composition was found to have an impact resistance of less than 2 inch-pounds.

EXAMPLE 3

89 parts of elemental sulfur in the molten state at a temperature of 135° C. is poured into a 250 cc. stainless steel beaker contained in a heating mantel. To this beaker are then added 10 parts of the reaction product of Example 1, 1 part of calcium carbonate, and the melt is heated to 150° C. and maintained at this temperature for 30 minutes. The melt is poured into aluminum foil evaporating dishes, approximately 2" in diameter and ½" high, and allowed to cool to room temperature whereupon the compositions solidify. The solid compositions are then tested for impact strength and found to have an impact resistance of greater than 8 inch-pounds.

EXAMPLE 4

94 parts of elemental sulfur in the molten state at a temperature of 135° C. is poured into a 250 cc. stainless steel beaker contained in a heating mantel. To this beaker are then added 5 parts of the reaction product of Example 1, 1 part of calcium carbinate, and the melt is heated to 150° C. and maintained at this temperature for 30 minutes. The melt is poured into aluminum foil evaporating dishes, approximately 2" in diameter and ½" high, and allowed to cool to room temperature whereupon the compositions solidify. The solid compositions are then tested for impact strength and found to have an impact resistance of greater than 6 inch-pounds.

EXAMPLE 5

To a 250 milliliter flask equipped with stirrer, condenser, thermometer, and dropping funnel, are added 50 grams (0.248 mole) of dimercapto ethyl cyclohexane, 0.3 gram of sodium and 150 milliliters of ethanol. To the flask at room temperature are then added 34.2 grams (0.57 mole) of ethylene sulfide dropwise. The ethylene sulfide addition requires 30 minutes and the temperature of the mixture rises from 25° C. to 58° C. The mixture is then heated to 65° C. and maintained at that temperature for 19 hours while continuously agitating the mixture. A semisolid precipitate was filtered from the mixture, dissolved in chloroform, and recovered by distilling off the chloroform to yield 68 grams of product.

EXAMPLE 6

79 parts of elemental sulfur in the molten state at a temperature of 135° C. is poured in a 250 cc. stainless steel beaker contained in a heating mantel. To this beaker are then added 20 parts of the reaction product of Example 5, 1 part of calcium carbonate and the melt is heated to 150° C. and maintained at this temperature for 30 minutes. The melt is poured into aluminum foil evaporating dishes, approximately 2" in diameter and ½" high and allowed to cool to room temperature. The solid compositions are then tested for impact strength and found to have an impact resistance of 10 inch-pounds. Two dimercapto ethyl cyclohexane plasticized compositions prepared by the method of this example are found to have an impact resistance of less than 3 inch-pounds.

EXAMPLES 7-13

Plasticized compositions containing the following plasticizer reaction products are prepared by the method of the preceding example. Examples 10-13, however, are the reaction products of 89 parts elemental sulfur and 10 parts plasticizer. The plasticized reaction products are prepared by the method of Example 1. Although varying somewhat, the plasticized compositions are found to have impact resistances between about 6 and 16 with those compositions prepared from polymercaptans containing a —$(CH_2)_{n'}$SH group wherein $n'$ is an integer of 2 or 3 averaging between about 10 and 16.

| | Parts by molar weight | | | | | | |
|---|---|---|---|---|---|---|---|
| Examples | 7 | 8 | 9 | 10 | 11 | 12 | 13 |
| Reactant: | | | | | | | |
| Ethylene sulfide | 2 | | | | 5 | | |
| Cyclohexene sulfide | | 1 | | | | 2 | |
| Propylene sulfide | | | 3 | | 2 | | 2 |
| Trimercapto cyclododecane | | | 1 | | | 1 | |
| Dimercapto ethane | | | | 1 | | | 1 |
| p-Dimercapto benzene | | 1 | | | | | |
| Dimercapto ethylbenzene | | | | | 1 | | |
| Ethylene glycol bis (thioglycolate) | | | | | | 2 | |

The data of the preceding examples indicate that the reaction product of a polymercaptan and an episulfide is superior as a plasticizer to the polymercaptan, alone, as demonstrated by improved impact resistance. This may be explainable by the fact that the reaction product contains a thioether linkage but the reason for its effectiveness is not understood. It may also be seen from the data that the invention compositions have impact resistance of at least six inch-pounds. This is significant in that for most road working applications, and particularly for heavily trafficked areas, the plasticized composition should have an impact resistance of at least 4 inch-pounds.

We claim:
1. A plasticizer for sulfur consisting essentially of the product of the reaction of ethylene glycol bis(thioglycolate) or a polymercaptan of the formula HS—R—(SH)$_n$ wherein R is alkyl, cycloalkyl, aryl or alkaryl having up to 20 carbon atoms and $n$ is an integer of from 1 to 2 inclusive, and ethylene sulfide, propylene sulfide, 1-butene sulfide or cyclohexene sulfide at between about 0° C. and about 100° C. in a molar ratio of at least 1:2 in the presence of sodium as a catalyst.
2. The plasticizer of claim 1 wherein the episulfide containing compound is ethylene sulfide and the polymercaptan is dimercapto ethane.
3. The plasticizer of claim 1 wherein the episulfide containing compound is ethylene sulfide and the polymercaptan is dimercapto dipentene.
4. The plasticizer of claim 1 wherein the episulfide containing compound is propylene sulfide and the polymercaptan is dimercapto ethane.
5. The plasticizer of claim 1 wherein the episulfide containing compound is cyclohexene sulfide, and the polymercaptan is p-dimercapto benzene.
6. The plasticizer of claim 1 wherein the episulfide containing compound is ethylene sulfide, and the polymercaptan is ethylene glycol bis(thioglycolate).
7. The plasticizer of claim 1 wherein the episulfide containing compound is propylene sulfide, and the polymercaptan is trimercapto cyclododecane.
8. The plasticizer of claim 1 wherein the episulfide containing compound is propylene sulfide, and the polymercaptan is dimercapto ethylbenzene.
9. The plasticizer of claim 1 wherein the episulfide containing compound is propylene sulfide, and the polymercaptan is bis (mercapto ethyl) cyclohexane.

References Cited

UNITED STATES PATENTS 3,403,187   9/1968   Oswald et al. _____ 260—609

CHARLES B. PARKER, Primary Examiner

D. R. PHILLIPS, Assistant Examiner

U.S. Cl. X.R.

94—15; 106—19, 287; 260—481, 609